Sept. 24, 1968  J. VAN POOL  3,403,198

REMOVAL OF FLUORIDES FROM HYDROCARBON STREAMS

Filed Feb. 14, 1966

INVENTOR
JOE VAN POOL
BY Young and Quigg
ATTORNEYS 3,403,198
REMOVAL OF FLUORIDES FROM
HYDROCARBON STREAMS
Joe Van Pool, Bartlesville, Okla., assignor to Phillips
Petroleum Company, a corporation of Delaware
Filed Feb. 14, 1966, Ser. No. 526,992
7 Claims. (Cl. 260—683.42)

ABSTRACT OF THE DISCLOSURE

Organic fluorides and HF are removed from hydrocarbon streams by chemically reacting potassium hydroxide with the fluorides by introducing in said streams an alcohol, such as, ethanol, methanol or propanol. The reaction with alcohol takes place with either solid KOH or with an aqueous-alcoholic solution of potassium hydroxide. The potassium fluoride formed in the reaction may be reacted with CaO to regenerate KOH. The invention is particularly useful in HF alkylation reaction to reduce the fluorine content of propane which is formed as a by-product in the reaction.

---

This invention relates to the removal of fluorides including organic fluorides and hydrogen fluoride from hydrocarbon streams containing such fluorides. In one aspect this invention relates to a method for removing fluorides from a hydrocarbon stream by a chemical reaction or reactions involving the fluorides. In another aspect the invention relates to a method for purifying a hydrocarbon stream containing fluorides.

In a process for the conversion of hydrocarbons wherein liquid hydrogen fluoride (HF) is employed as a catalyst there inevitably occur side reactions in addition to the desired conversion reaction. For example, hydrogen fluoride reacts with some of the hydrocarbons to form organic fluorides.

In a typical HF alkylation reaction, for example, the alkylation of isobutane with a butene to form isooctane, the reactor effluent is fractionally distilled to remove low-boiling hydrocarbons from the alkylate. In those instances where the low-boiling hydrocarbons are recycled to the process the presence therein of organic fluorides poses no problem. However, in those instances wherein the low-boiling hydrocarbons are utilized as a product, it is often necessary that these hydrocarbons be substantially free from hydrogen fluoride or organic fluorides. At the present time the specification for propane for certain uses requires a maximum of 50 parts per million of fluorides measured as fluorine. Physical methods are often utilized to reduce the fluorine content of propane produced as a by-product in an alkylation process. These physical methods recover the major portion of the HF and recycle it to the alkylation reaction. There remain, however, some organic fluorides and HF which must be removed, or at least further reduced, to meet the requirements of a specification such as that noted above.

It is therefore an object of this invention to provide a method and means for reducing the fluorine content of a hydrocarbon stream to an extremely low level. It is an object of this invention to provide a method for reducing the fluorine content of a hydrocarbon stream to a value below about 50 p.p.m. Still another object of this invention is to provide an economical and simple chemical method for purifying a hydrocarbon stream containing fluorine compounds as impurities. Other objects and advantages of the invention will be apparent to one skilled in the art upon studying this disclosure including the detailed description of the invention and the drawing wherein:

Figure 1:
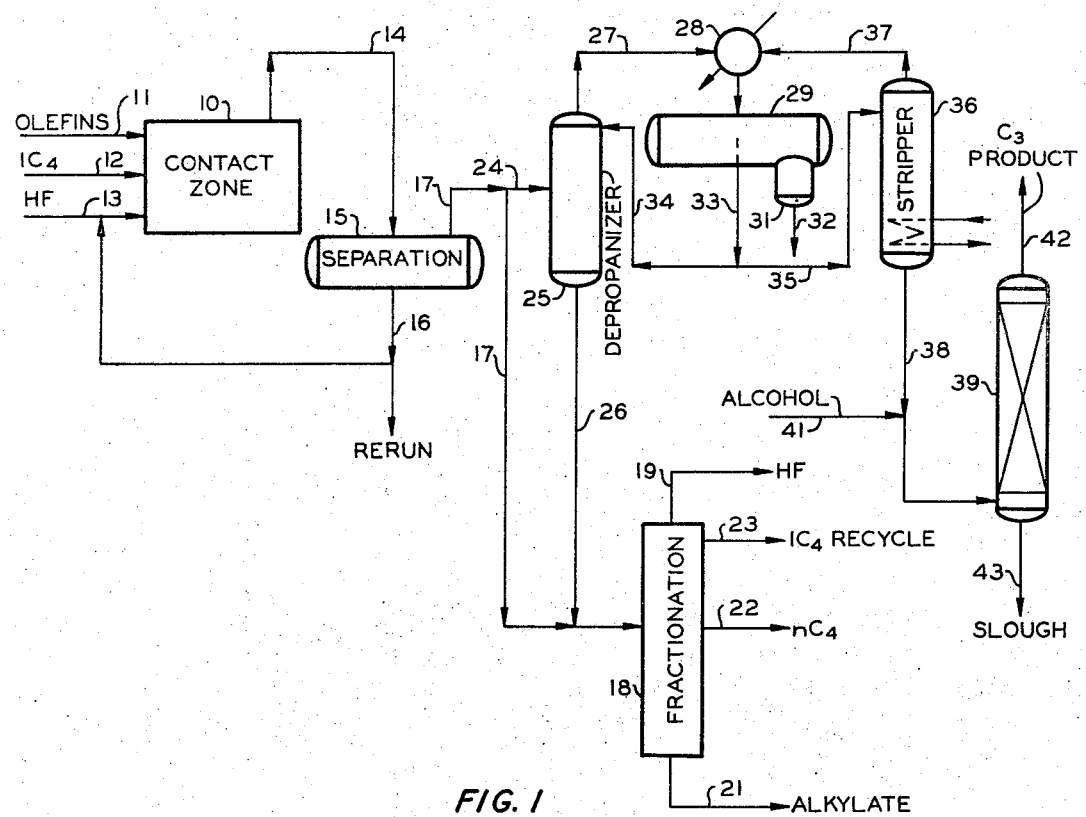
FIGURE 1 is a schematic flow diagram of one embodiment of the invention.

Potassium hydroxide (KOH) has been used to remove HF from hydrocarbons by chemical reaction forming KF and $H_2O$. I have now discovered that organic fluorides can also be removed by chemical reaction of KOH with the organic fluorides by introducing into the hydrocarbon stream to be treated an alcohol in which the organic fluoride is soluble whereby the organic fluoride is converted to an olefin with concomitant formation of KF and $H_2O$. The reaction for destroying propyl fluoride is shown in the following equation:

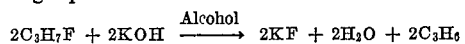

$$2C_3H_7F + 2KOH \xrightarrow{\text{Alcohol}} 2KF + 2H_2O + 2C_3H_6$$

The reaction for destroying HF is well known and is illustrated in the following equation:

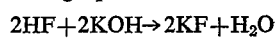

$$2HF + 2KOH \rightarrow 2KF + H_2O$$

The KF can be reacted with calcium oxide to regenerate KOH and to form $CaF_2$ which is one of the least objectionable compounds of fluorine so that the $CaF_2$ precipitated in the regeneration reaction poses no problem of disposal. Furthermore, CaO is cheaper and more readily available than KOH and therefore the process of the present invention provides not only a simple and effective means for removing fluorine compounds from hydrocarbon streams but is also a very economical process for such removal. The reaction for the regeneration of KOH is shown in equation 3:

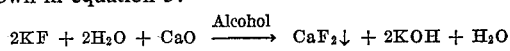

$$2KF + 2H_2O + CaO \xrightarrow{\text{Alcohol}} CaF_2\downarrow + 2KOH + H_2O$$

Although the destruction of organic fluorides to form the corresponding olefin is applicable to all such fluorides that are soluble in an alcohol that is miscible with water and insoluble in the hydrocarbon, the principal utility for the process of the invention is in the purification of propane containing relatively small amounts, e.g., 200 to 1000 p.p.m., of fluorides as fluorine. The physical methods for removing fluorides from hydrocarbons allow recovery of the fluorides and are usually utilized when larger amounts of fluorides are to be removed. The process of the present invention is more applicable to the removal of very small amounts of fluorides where the quantities are insignificant so far as use in a hydrocarbon conversion process is concerned.

Alcohols are applicable for use in this invention which are miscible with water and in which the organic fluoride is appreciably soluble but is not appreciably soluble in the hydrocarbon. The solubility of the organic fluorides in the alcohol must be high enough so that the quantities of the organic fluorides remaining undissolved in the alcohol will be less than the minimum quantity permissible in the final product. Ethanol is a particularly desirable alcohol for use in the conversion of propyl fluorides to the corresponding propene because of its solubility characteristics; however methanol or propyl alcohols, e.g., normal propyl alcohol and isopropyl alcohol, can be used satisfactorily for converting relatively low boiling organic fluorides such as ethyl, propyl and butyl fluorides.

The contacting will usually be done at ambient temperature; however it will usually be preferred to operate at a temperature between about 50° F. and 125° F. Although the invention is operable at any temperature at which the aqueous phase is liquid, the solubility of the alcohol in the hydrocarbon increases at higher temperatures and will be undesirably high at temperatures above 125° F. and the reaction rate will be undesirably low at temperatures below about 50° F. These same limitations apply in the non-aqueous contacting, i.e., the process of FIGURE 1, where the alcohol is added to the hydrocarbon stream. The pressure will be that necessary to maintain the hydrocarbon in the liquid phase.

In the alkylation of isobutane with a butene, the butene stream often contains propene as an impurity and this is the principal source of the propyl fluorides in an HF alkylation process effluent although some propyl fluorides are produced in the process as a by-product. The propyl fluorides, principally isopropyl fluoride, are produced as an impurity in the propane product stream and this product stream is the one of principal concern in the present invention because the propane is utilized in liquefied petroleum gas products. The invention is, however, applicable to other low boiling hydrocarbon streams, for example, ethane and normal butane, when such hydrocarbons are to be utilized in liquefied petroleum gas or liquefied natural gas products.

In FIGURE 1 an alkylation system is illustrated comprising a reactor or contact zone 10 having inlet conduits 11 for olefins, such a butenes, 12 for isoparaffins such as isobutane, and 13 for hydrogen fluoride (HF) catalyst. Effluent from contact zone 10 is removed via conduit 14 and passed to phase separator 15 where an HF phase settles and is removed via conduit 16 for recycle to contact zone 10 or to a rerun system (not shown) for removal of impurities.

Hydrocarbon phase is removed from separation zone 15 via conduit 17 and passed to fractionation zone 18, which can be a plurality of distillation columns, where HF is removed as via conduit 19, alkylate is removed via conduit 21, normal butane is removed via conduit 22 and isobutane is removed via conduit 23 and recycled to contact zone 10 via conduit 12. Propane present in the feed to fractionator 18 is often removed along with the isobutane via conduit 23. Propane is often present in the fresh isobutane feed and some propane is produced in the process. In order to prevent a build-up of propane in the system, a stream is passed from conduit 17 via conduit 24 to depropanizer 25. Propane-free bottoms is passed via conduit 26 to conduit 17 and thence to fractionator 18. Overhead products comprising propane, HF and alkyl fluorides are passed via conduit 27 and condenser 28 to phase separator 29. Liquid HF accumulates in sump or leg 31 and is withdrawn via conduit 32. Hydrocarbon liquid, principally propane, containing dissolved HF and alkyl fluoride, e.g., propyl fluoride, is withdrawn via conduit 33. A first portion is passed via conduit 34 to depropanizer 25 and a second portion is passed via conduit 35 to stripper 36 for removal of HF. Overhead products comprising HF and a small amount of propane pass via conduit 37 and condenser 28 back to phase separator or accumulator 29. Bottom products comprising propane containing alkyl fluorides and a small amount of HF are passed via conduit 38 to contact vessel 39 containing a bed of solid KOH. Alcohol, e.g., methyl alcohol, is passed to conduit 38 via conduit 41. Propane of substantially reduced fluoride content is removed as product via conduit 42. A slurry of alcohol, water, KF and KOH is removed via conduit 43 for disposal or for recovery of alcohol and KOH. The propane product stream is substantially dry.

Figure 2:
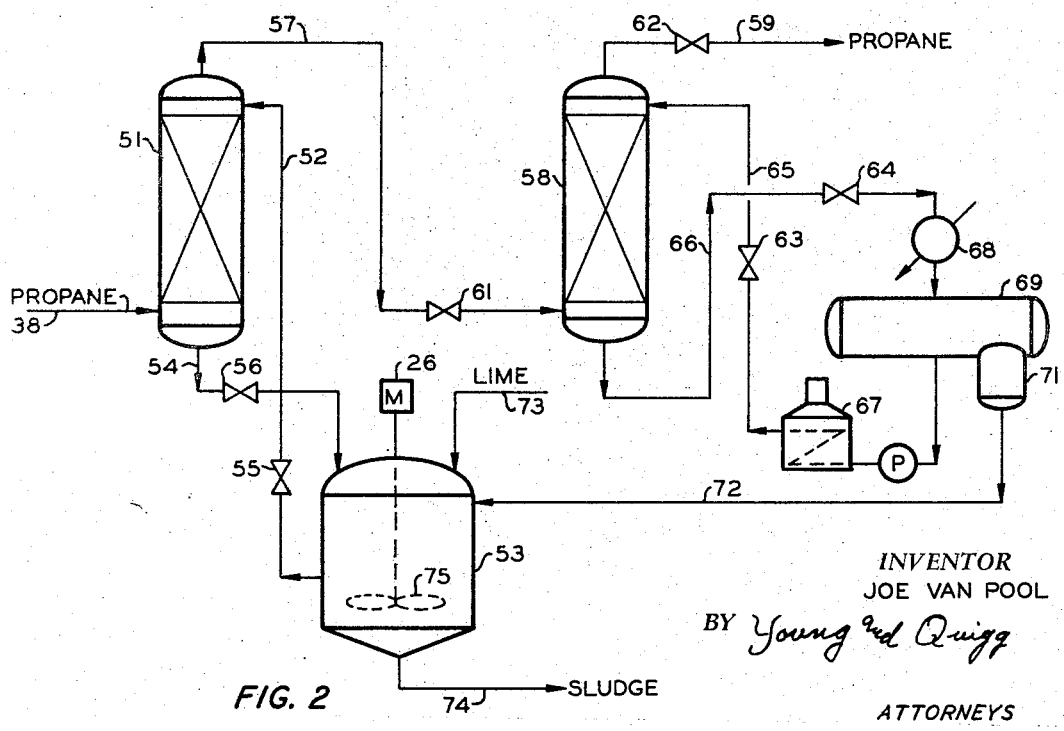
FIGURE 2 is a schematic flow diagram of another embodiment of the invention.

In FIGURE 2 a fluoride-containing propane stream which can be the stripper bottoms product in conduit 38 is passed into the lower portion of a liquid-liquid contact vessel 51 which can be any closed vessel containing a mass or body of contact material such as carbon rings. A vessel having a height to diameter ratio of at least about 1½:1 will usually be prefererd to discourage channeling and to obtain good contact of liquids. An aqueous alcohol solution of KOH is introduced into the upper portion of contact vessel 51 from KOH generator 53 via conduit 52. An aqueous alcohol solution of KF and KOH is returned from contact vessel 51 to KOH regenerator 53 via conduit 54. Valves 55 and 56 can be employed to control the liquid level of the aqueous phase in contact vessel 51. The propane stream removed from contact vessel 51 via conduit 57 has a substantially reduced fluoride content but is saturated with water. The wet propane stream is passed to drying vessel 58 which can be packed with a desiccant such as bauxite and a substantially dry propane stream removed via conduit 59.

The desiccant in drying vessel 58 can be regenerated periodically by closing valves 61 and 62 and opening valves 63 and 64 in conduits 65 and 66 so that propane heated in heater 67 is passed via conduit 65 into dryer 58. Wet propane is passed via conduit 66 and condenser 68 to phase separator 69. Water and alcohol collect in sump 71 and are passed via conduit 72 to KOH regenerator 53. Lime (Ca(OH)$_2$) is passed to KOH regenerator via conduit 73 to regenerate KOH from KF. A slurry of CaF is removed from KOH generator via conduit 74 for disposal. Regeneration of KOH is facilitated by agitator 75 operated by motor 76.

In FIGURE 1 solid KOH is employed and the vessel 39 is periodically recharged with solid KOH. In FIGURE 2 an aqueous solution of KOH is utilized and is regenerated in regenerator 53. Water of reaction is produced and the excess water is removed from time to time as may be necessary in order to add fresh KOH and alcohol unavoidably lost in the process.

The following example will be helpful in attaining an understanding of the invention; however the example is to be construed as illustrative of, rather than limiting, the invention.

EXAMPLE

The following tabulation shows the removal of fluorine compounds according to the solid KOH treatment of FIGURE 1 and the aqueous solution of liquid KOH treatment of FIGURE 2.

|  | I | II |
|---|---|---|
|  | Solid Treat | Liquid Treat |
| Feed liquid propane, b./d | 5,630 | 5,630 |
| Hydrogen fluoride, p.p.m.[1] | 30 | 30 |
| Organic fluorides, p.p.m.[1] | 350 | 350 |
| Product liquid propane, b./d | 5,630 | 5,630 |
| Hydrogen fluoride, p.p.m.[1] | Nil | Nil |
| Organic Fluorides, p.p.m.[1] | 40 | 40 |
| Conditions of reaction: |  |  |
| Temperature, °F | 100 | 100 |
| Pressure, p.s.i.g | 285 | 285 |
| Solid KOH pellets, ½ in | Yes | No |
| Ethanol injection, b./d.[4] | 36 (5-50) |  |
| Aqueous KOH | No | Yes |
| Weight percent KOH |  | 10 (5-20) |
| Weight percent ethanol |  | 50 (15-60) |
| Space Velocity, liq. vol./vol./hr.[3] | 1 (0.1-10) |  |
| Contact velocity, vol./vol./hr.[4] |  | 1 (0.1-10) |
| Regeneration: Lime, (Ca(OH)$_2$), lb./day |  | 700 |

[1] As F.
[2] 0.5 to 5 gal alcohol/lb. fluorides as F.
[3] Vol propane/vol. KOH solid /hr.
[4] Vol Propane/vol. reagent/hr.

The above shows that either the solid or liquid treatment reduces the fluoride content of the hydrocarbon stream to below 50 p.p.m. In the solid treatment the alcohol injection is about 0.5 to 5 gallons per pound of fluorides measured as F. This is about 5 to 50 barrels per day for the specific example illustrated. While a space velocity of 1 was used in the example, a range of about 0.1 to 10 can be utilized. The slurry of KF, water and alcohol withdrawn via conduit 43 can be discarded or processed for recovery of alcohol and KOH.

In the liquid treatment the reagent is regenerated and recycled. The weight percent ethanol in the aqueous reagent can be from about 15 to 60. The contact velocity can be from about 0.1 to 10. This will give gallons of alcohol per pound of fluoride of 10 to 5000. Normally this range will be about 100 to 500.

That which is claimed is:

1. A process for removing organic fluorides from a liquid hydrocarbon stream containing organic fluorides which comprises contacting said stream with potassium hydroxide and an alcohol selected from the group consisting of methanol, ethanol and propyl alcohols at the contacting temperature in the range of about 50 to 125° F.; and removing said alcohol, water and potassium fluoride from said stream.

2. A process according to claim 1 wherein said hydrocarbon stream also contains hydrogen fluoride which is removed as potassium fluoride.

3. A process according to claim 1 wherein the potassium hydroxide is a solid and the alcohol is added to the hydrocarbon prior to contacting said hydrocarbon with said potassium hydroxide.

4. A process according to claim 1 wherein the hydrocarbon stream is contacted with an aqueous-alcoholic solution of potassium hydroxide.

5. A process according to claim 4 wherein the potassium fluoride removed from the hydrocarbon stream is reacted with calcium oxide to regenerate potassium hydroxide and the potassium hydroxide is returned to the aqueous-alcoholic solution of potassium hydroxide.

6. The process of claim 3 wherein the added alcohol is in the amount of about 0.5 to 5 gallons per pound of fluorides calculated as fluorine, the solid potassium hydroxide is in the form of a bed of pellets, and the space velocity of the hydrocarbon through the bed is about 0.1 to 10.

7. The process of claim 4 wherein the aqueous-alcoholic solution contains about 15 to 60 weight percent alcohol and about 5 to 20 weight percent potassium hydroxide, and the contact velocity of hydrocarbon through the reagent is about 0.1 to 10.

References Cited

UNITED STATES PATENTS

| 2,377,546 | 6/1945 | Frey | 208—262 |
| 2,391,149 | 12/1945 | Frey | 208—262 |
| 2,474,032 | 6/1949 | Byrns | 208—262 |
| 2,761,888 | 9/1956 | Horeczy et al. | 260—683.42 |
| 2,832,811 | 4/1958 | Boynton et al. | 206—683.42 |

FOREIGN PATENTS 564,683   10/1958   Canada.

DELBERT E. GANTZ, *Primary Examiner.*

G. J. CRASANAKIS, *Assistant Examiner.*